(12) United States Patent
Wang et al.

(10) Patent No.: US 10,502,129 B2
(45) Date of Patent: Dec. 10, 2019

(54) DOUBLE-CRANKSHAFT ENGINE

(71) Applicant: XUZHOU XIAN BO ENGINE MACHINERY TECHNOLOGY CO., LTD., Xuzhou (CN)

(72) Inventors: Pengbo Wang, Xuzhou (CN); Ping Wang, Nanjing (CN); Yinping Liu, Dongying (CN)

(73) Assignee: XUZHOU XIAN BO ENGINE MACHINERY TECHNOLOGY CO., LTD., Xuzhou (CN)

( * ) Notice: Subject to any disclaimer, the term of this patent is extended or adjusted under 35 U.S.C. 154(b) by 0 days.

(21) Appl. No.: 16/309,933

(22) PCT Filed: Jun. 16, 2017

(86) PCT No.: PCT/CN2017/088810
§ 371 (c)(1),
(2) Date: Mar. 18, 2019

(87) PCT Pub. No.: WO2017/215665
PCT Pub. Date: Dec. 21, 2017

(65) Prior Publication Data
US 2019/0203640 A1    Jul. 4, 2019

(30) Foreign Application Priority Data

Jun. 16, 2016   (CN) .......................... 2016 1 0431728

(51) Int. Cl.
*F02B 75/32* (2006.01)
*F16C 7/02* (2006.01)
(Continued)

(52) U.S. Cl.
CPC .............. *F02B 75/32* (2013.01); *F02B 75/04* (2013.01); *F02B 75/044* (2013.01); *F02B 75/20* (2013.01);
(Continued)

(58) Field of Classification Search
CPC ............................ F02B 75/225; F02B 75/065
See application file for complete search history.

(56) References Cited

FOREIGN PATENT DOCUMENTS

| AT | 412792 B | 7/2005 |
|----|----------|--------|
| CN | 102536455 A | 7/2012 |

(Continued)

OTHER PUBLICATIONS

Deryavchen, SU1281700, Derwent abstract. (Year: 1987).*

*Primary Examiner* — Hung Q Nguyen
*Assistant Examiner* — Mark L. Greene
(74) *Attorney, Agent, or Firm* — Gokalp Bayramoglu (57) ABSTRACT

A dual-crankshaft engine includes a piston and two crankshafts constituting a double-crank mechanism, and further includes a cylindrical block. The cylindrical block includes a cylinder portion and a crankshaft support portion. A lower end of the piston is a piston guiding rod. A piston rod guiding groove is provided in the cylindrical block. A lower end of the piston is opened, and provided with a piston end cover. The piston end cover and the piston guiding rod are detachably and fixedly connected. The piston is a non-skirted piston where the piston sealing end is separated from the piston guiding end. The piston sealing end is the piston head of the piston. The piston guiding end is the piston guiding rod and the piston rod guiding groove. The piston is designed to be equi-stress, which increases the strength.

9 Claims, 7 Drawing Sheets

(51) Int. Cl.
  *F02F 7/00*   (2006.01)
  *F02F 3/00*   (2006.01)
  *F02B 75/04*  (2006.01)
  *F02B 75/20*  (2006.01)

(52) U.S. Cl.
  CPC .......... *F02F 3/0015* (2013.01); *F02F 3/0084* (2013.01); *F02F 7/0087* (2013.01); *F16C 7/023* (2013.01)

(56) References Cited

FOREIGN PATENT DOCUMENTS

| | | | | |
|---|---|---|---|---|
| CN | 104481689 | A | 4/2015 | |
| CN | 104533614 | A | 4/2015 | |
| CN | 1044863707 | A | 8/2015 | |
| CN | 105927380 | A | 9/2016 | |
| CN | 205744144 | U | 11/2016 | |
| DE | 202009001285 | U1 | 6/2009 | |
| JP | 2013083221 | A | 5/2013 | |
| SU | 1281700 | A1 * | 1/1987 | ............ F02B 75/065 |
| WO | 2005038197 | A1 | 4/2005 | |
| WO | 2010096187 | A2 | 8/2010 | |

\* cited by examiner

DOUBLE-CRANKSHAFT ENGINE

CROSS REFERENCE TO RELATED APPLICATIONS

This application is the national phase entry of International Application No. PCT/CN2017/088810, filed on Jun. 16, 2017, which is based upon and claims priority to Chinese Patent Application No. 201610431728.9 filed on Jun. 16, 2016, the entire contents of which are incorporated herein by reference.

TECHNICAL FIELD

The present invention relates to a dual-crankshaft engine, which belongs to the technical field of engines.

BACKGROUND

At present, in both gasoline engines and diesel engines, the actual thermal efficiency is much lower than the theoretically possible thermal efficiency. One of the primary causes for this phenomenon is that the components directly contacting high-temperature gas, such as cylinder liners, pistons, etc., are made of metal material with poor thermal insulation performance. The continuous and reliable work of metal material depends on the cooling system continuously cooling the heat absorbed from the airtight combustor. Ceramic material is a material with good thermal insulation performance. The components directly contacting high-temperature gas, such as cylinder liners, pistons, etc., are made of ceramic material, which can improve the actual thermal efficiency. However, the low reliability due to the brittleness of ceramic material becomes a technical obstacle to apply the ceramic material to the engine.

The patent (application No. CN 201410653964.6) filed by the present inventors has solved the above problems to a certain extent, but the processing and manufacturing method is complicated, the friction surfaces of the relative motion wear heavily, and some detail problems remain to be solved.

SUMMARY

In order to overcome the above-mentioned deficiencies in the prior art, the present invention provides a dual-crankshaft engine, which improves the double-crank mechanism engine, effectively reduces the abrasion and impact of the piston and the cylinder liner, increases the reliability of the ceramic material applied to the engine, and increases the actual thermal efficiency. Meanwhile, the present invention uses a design with a variable compression ratio by adjusting the variable length of the piston to change the compression ratio of the engine when the piston is at the top dead center. When the engine is under medium and small load conditions, a large compression ratio is used to improve the thermal efficiency. When the engine is under a full load condition, a small compression ratio is used to prevent knocking.

The present invention is achieved by the following technical solution: a dual-crankshaft engine includes a cylinder and a piston capable of linearly reciprocating in the cylinder.

Two crankshafts configured in parallel are arranged on two sides of the cylinder, and a connection rod is hinged between the two crank pins corresponding to the two crankshafts to form a double-crank mechanism;

The dual-crankshaft engine further includes a cylindrical block. The cylindrical block includes a block portion that forms the cylinder and a crankshaft support portion for containing and supporting the double-crank mechanism;

A piston head is provided on a top end of the piston. A neck portion is provided on a lower end of the piston head. A cylindrical piston guiding rod is provided on a lower end of the neck portion. A slot is provided on the piston guiding rod. The connection rod is slidably inserted into the slot. A piston rod guiding groove matched with the piston guiding rod is provided in the cylindrical block. The lower end of the slot is open and is provided with a piston end cover. The piston end cover and the piston guiding rod are detachably and fixedly connected.

The piston is a non-skirted piston with a piston guiding end separated from a piston sealing end. The piston sealing end is the piston head. The piston guiding end is the piston guiding rod and the piston rod guiding groove.

A plurality of cylinders are provided. The plurality of cylinders are arranged in a row or in two rows opposing each other. The numbers and positions of the connection rods, the piston guiding rods and the crank pins on each crankshaft respectively correspond to the numbers and positions of the cylinders.

Portions in which the piston and the cylinder directly contact high temperature gas are made of ceramic material.

The connection rod includes a connection rod main body located in the slot. Connection rod semicircular covers are mounted at two ends of the connection rod main body. The connection rod semicircular covers and the connection rod main body are detachably and fixedly connected to a hinge portion of the crank pin. An upper edge and a lower edge of the connection rod main body which contacts the slot are respectively provided with a wear-resistant layer.

The wear-resistant layer is coated on the surface of the connection rod main body connection rod main body, or a separately formed semicircular wear-resistant material layer, or a separately arcuate block-shaped wear-resistant material layer.

The piston guiding rod is a cylindrical rod.

An end portion of each crankshaft is mounted with a transmission gear. An output gear is engaged between the two transmission gears, and is mounted on a mandrel of the cylindrical block. A housing for containing the transmission gear is provided on the cylindrical block.

The interior of the cylindrical block is provided with shaft holes, a spindle of each crankshaft passes through the corresponding shaft holes inside the cylindrical block respectively. A semicircular cover is mounted on a bottom of each shaft hole.

The neck portion is a cross-shaped pillar composed of four rib plates. Outer sides of the four rib plates are approximate equi-stress arcs. Or an outer contour of the neck portion is a rotary body shape having an approximate equi-stress curved surface.

The piston is a piston having a variable compression ratio. A guiding slider is connected between the neck portion and the piston guiding rod. The guiding slider is slidably connected to the neck portion and is provided with a limiting device. The guiding slider and the piston guiding rod are detachably and fixedly connected. An elastic member groove is provided inside the neck portion. An elastic member is provided inside the elastic member groove. A compression clearance is set aside between the neck portion and the piston guiding rod.

The elastic member includes a plurality of disc springs.

The advantages of the present invention are as follow.

In the present invention, the acting point of force application is transferred from the high-temperature, high-pressure and high-speed area in which the piston and the cylinder liner reciprocatingly acts to other low-temperature and easy-to-lubricate area, which realizes that no other force exists between the piston and the air cylinder except the back pressure of the piston ring and the parts made of ceramics material, such as cylinder liner and the piston, are only subjected to the pressure load of high-temperature fuel gas, and improves the reliability and service life without increasing the toughness and manufacturing cost of ceramic material. Meanwhile, the connection between the piston and the connection rod and the connection between the connection rod and the crankshaft of the present invention are detachable structures, which has a good manufacturability. The piston is designed to be equi-stress, which increases the strength. The connecting portion of the connection rod and the piston is provided with wear-resistant design, which improves the wear-resistant performance and the reliability of the engine. The present invention further has the following advantages.

1. The reciprocating inertia force and the centrifugal inertia force can be entirely balanced, and the engine has only the overturning moment toward the external structure connected to the engine. Therefore, the vibration is small.

2. There is no lateral force and no stroking noise of the piston. Therefore, the noise is low.

3. The reciprocating mass is small, and the reciprocating acceleration is small, so the reciprocating inertia force is small. There is no lateral force, so the abrasion of the piston and the cylinder liner is less. Therefore, the engine external characteristic curve can be improved, and the power per liter is high;

4. All moving surfaces are in a low-temperature and easy-to-lubricate condition, and the mechanical efficiency can be improved.

5. Due to the existence of two crankshafts, the pressure sustaining capacity of the interior of the cylinder can be greatly increased, and the development potential is enormous.

6. The advantages of the mechanism ensures the reliability of using ceramic. The use of ceramic greatly increases the combustion temperature, and provides conditions for subsequent heat recovery.

7. In the compression stroke, the room-temperature water is spouted into the engine to decrease the temperature of the mixture gas. The compression ratio can be increased to 15 (the combined variable compression ratio is 15-26).

8. Before ignition, the high-pressure saturated water is spouted into the engine. The steam expands to do work. Meanwhile, due to the existence of steam, the heat transmission loss of the combustible gas transferred toward the cylinder wall can be reduced, thereby improving the thermal efficiency.

9. By means of the variable piston mechanism of the present invention, the compression ratio can realize the change from 11 to 18.6. Under the premise of ensuring a high load without knocking, the thermal efficiency of the medium load and small load is improved, thereby saving fuel consumption by 20%.

10. In the gas exhausting process, the piston is in the state of maximum extension, which can greatly reduce the remained exhaust gas, thereby further increasing the compression ratio and improving the thermal efficiency.

In the figures,
1. crankshaft,
1-1. crank pin,
1-2. oil channel,
1-3. spindle,
2. cylinder,
3. piston,
3-1. piston head,
3-2. neck portion,
3-3. wear-resistant semicircular sleeve,
3-4. slot,
3-5. piston guiding rod,
3-6. piston end cover,
3-7. rib plate,
3-8. elastic member groove,
3-9. guiding slider,
3-10. limiting device,
3-11. compression clearance,
4. connection rod,
4-1. connection rod main body,
4-2. connection rod semicircular cover,
4-3. wear-resistant layer,
4-4. weight reducing hole,
5. cylindrical block,
5-1. block portion,
5-2. crankshaft support portion,
5-3. piston rod guiding groove,
5-4. semicircular cover,
5-5. mandrel,
5-6. housing,
5-7. shaft hole,
6. transmission gear,
7. output gear, and
8. elastic member.

DETAILED DESCRIPTION OF THE EMBODIMENTS

The present invention will be further described hereinafter with the embodiments.

As shown in FIG. 1 to FIG. 10, a dual-crankshaft engine includes air cylinder 2 and piston 3 capable of linearly reciprocating in the cylinder, Two crankshafts 1 configured in parallel are arranged on two sides of the cylinder 2, and connection rod 4 is hinged between the two crank pins 1-1 corresponding to the two crankshafts 1 to form a double-crank mechanism;

The dual-crankshaft engine further includes cylindrical block 5. The cylindrical block 5 includes a block portion 5-1 that forms the cylinder 2 and crankshaft support portion 5-2 for containing and supporting the double-crank mechanism;

Piston head 3-1 is provided on a top end of the piston 3. Neck portion 3-2 is provided on a lower end of the piston head 3-1. Cylindrical piston guiding rod 3-5 is provided on a lower end of the neck portion 3-2. Slot 3-4 is provided on the piston guiding rod 3-5. The connection rod 4 is slidably inserted into the slot 3-4. Piston rod guiding groove 5-3 matched with the piston guiding rod 3-5 is provided in the cylindrical block 5. A lower end of the slot 3-4 is open and is provided with a piston end cover 3-6. The piston end cover 3-6 and the piston guiding rod 3-5 are detachably and fixedly connected. Preferably, the guiding rod 3-5 is cylindrical rod, which has a uniform stress, a good manufacturability and a simplified structure.

The piston 3 is a non-skirted piston with a piston guiding end separated from a piston sealing end. The piston sealing end is the piston head 3-1. The piston guiding end is the piston guiding rod 3-5 and the piston rod guiding groove 5-3.

A plurality of cylinders 2 are provided. The plurality of cylinders are arranged in a straight row or in two rows opposing each other. The amounts and positions of the pistons 3, the connection rods 4, the piston guiding rods 3-5 and the crank pins on each crankshaft 1 respectively correspond to the amounts and the positions of the cylinders 2.

Portions in which the piston 3 and the cylinder 2 directly contact a high temperature gas are made of a ceramic material.

Figure 12:
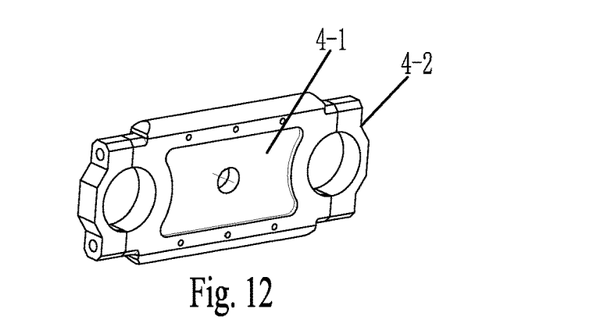
FIG. 12 is a perspective view of a connection rod of the present invention.

The connection rod 4 includes connection rod main body 4-1 located in the slot 3-4. Connection rod semicircular covers 4-2 are mounted at two ends of the connection rod main body 4-1. The connection rod semicircular covers 4-2 and the connection rod main body 4-1 are detachably and fixedly connected to a hinge portion of the crank pin 1-1. An upper edge and a lower edge of the connection rod main body 4-1 which contacts the slot 3-4 are respectively provided with wear-resistant layer 4-3.

The wear-resistant layer 4-3 is coated on the surface of the connection rod main body 4-1, or a separately formed semicircular wear-resistant material layer, or a separately arcuate block-shaped wear-resistant material layer.

Figure 9:
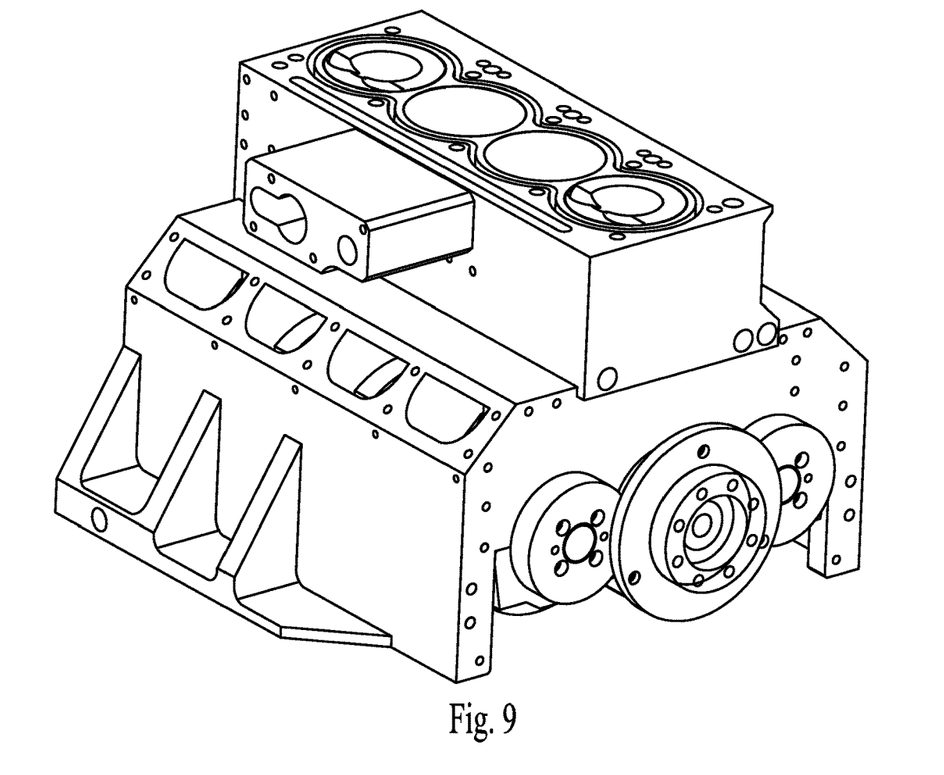
FIG. 9 is a perspective view of the external structure of the present invention.
Figure 10:
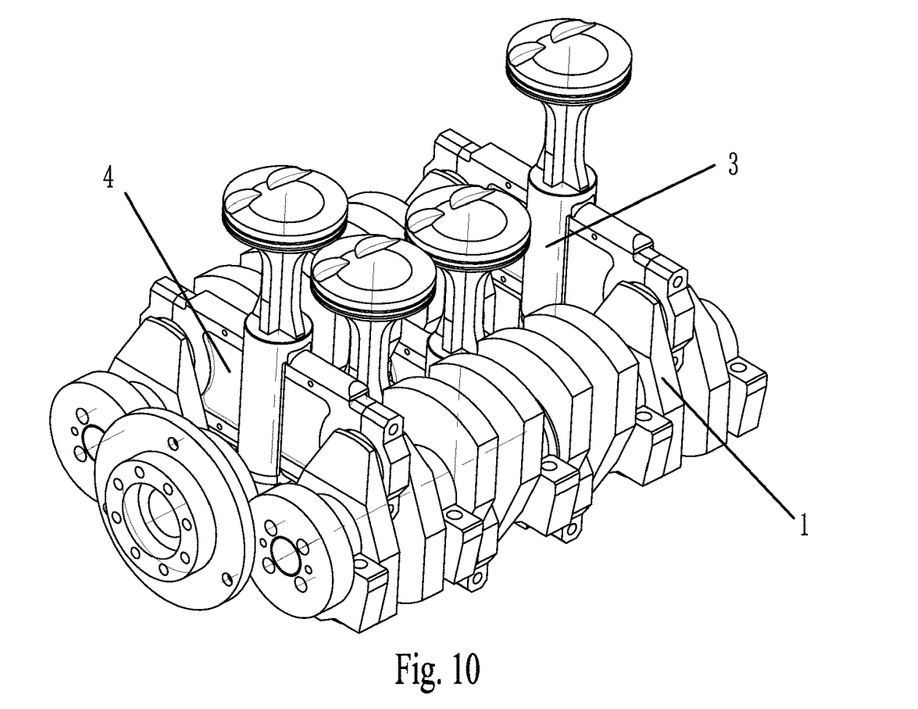
FIG. 10 is a perspective view of the internal structure of the present invention.

End portion of each crankshaft 1 is mounted with transmission gear 6. Output gear 7 is engaged between the two transmission gears 6, and is mounted on a mandrel 5-5 of the cylindrical block 5. A housing 5-6 for containing the transmission gear 6 is provided on the cylindrical block 5.

The interior of the cylindrical block 5 is provided with shaft holes 5-7, a spindle 1-3 of each crankshaft 1 passes through the corresponding shaft holes 5-7 inside the cylindrical block 5 respectively. Semicircular cover 5-4 is mounted on a bottom of each shaft hole 5-7.

Figure 1:
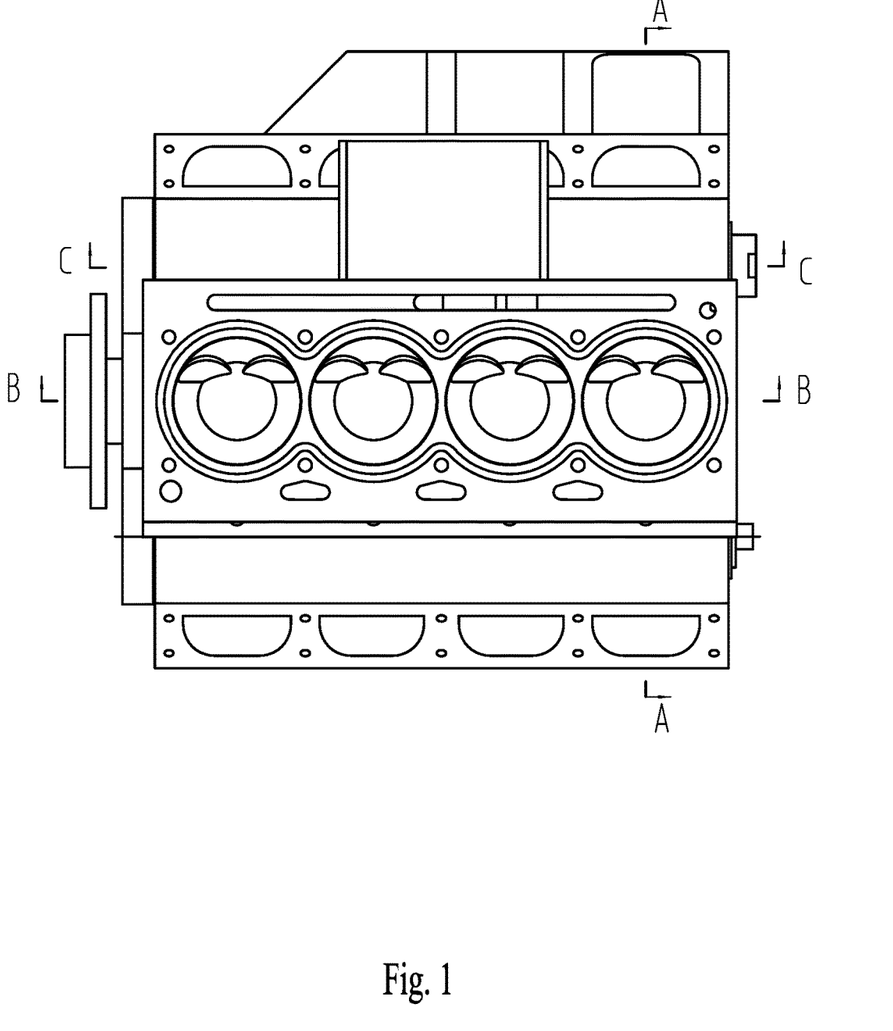
FIG. 1 is a top view of the present invention.
Figure 2:
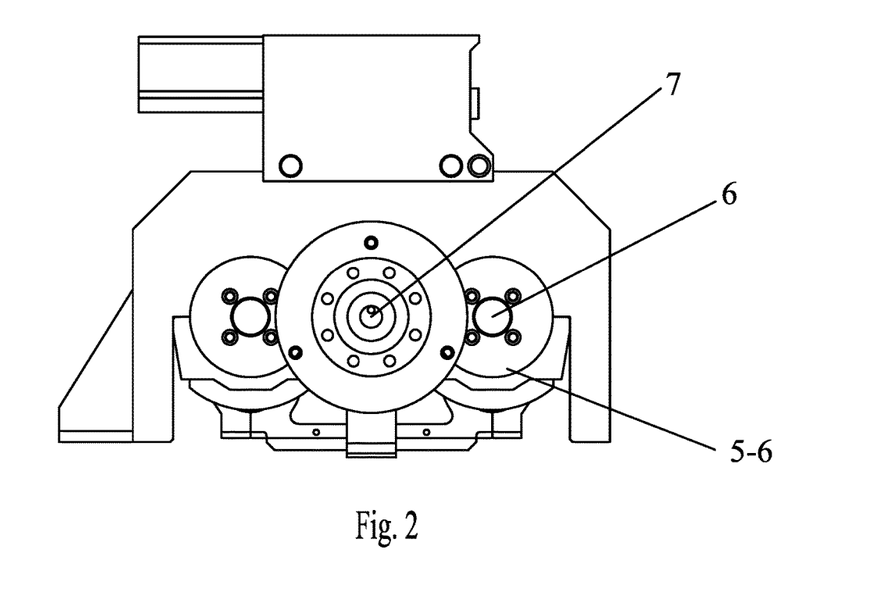
FIG. 2 is a left side view of the present invention.
Figure 3:
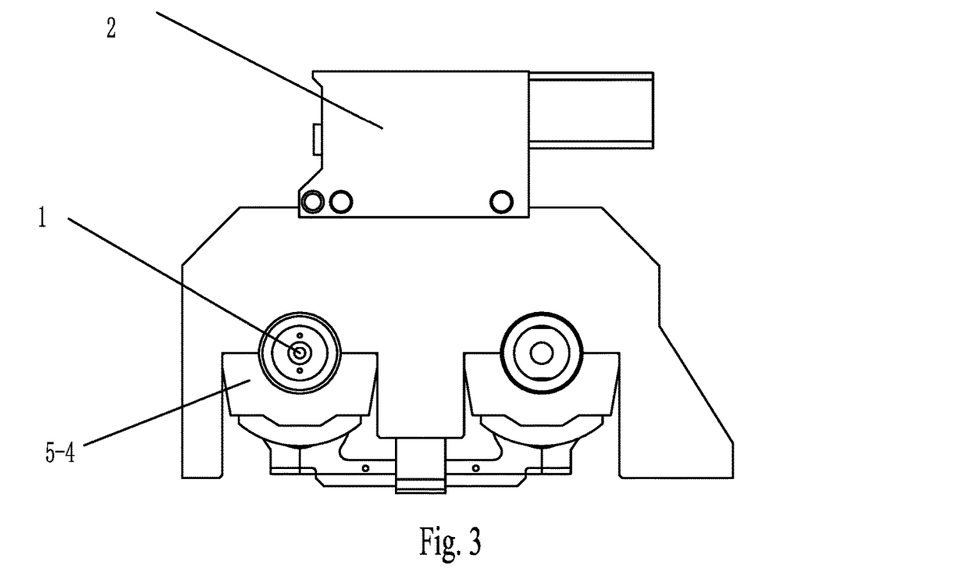
FIG. 3 is a right side view of the present invention.
Figure 4:
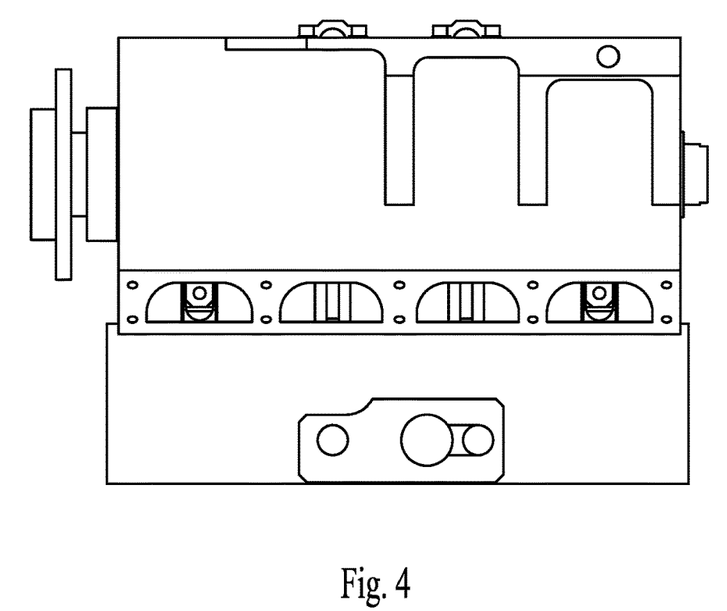
FIG. 4 is a front view of the present invention.
Figure 5:
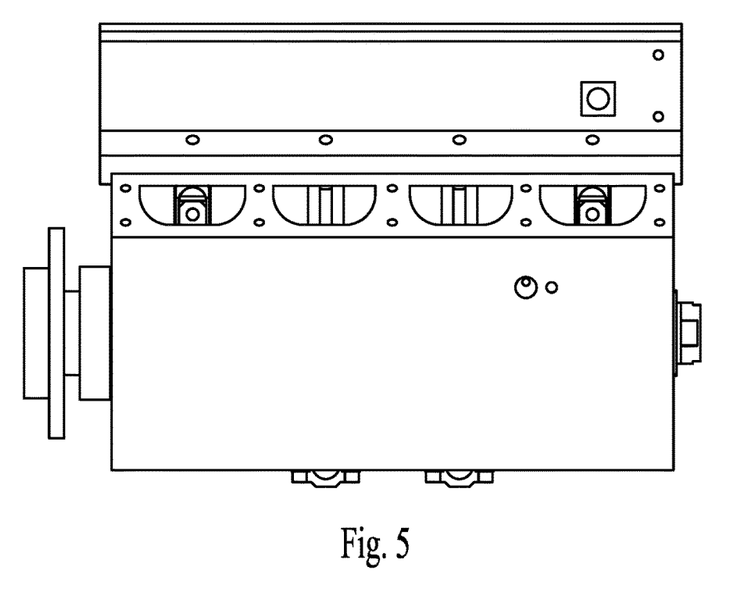
FIG. 5 is a rear view of the present invention.
Figure 6:
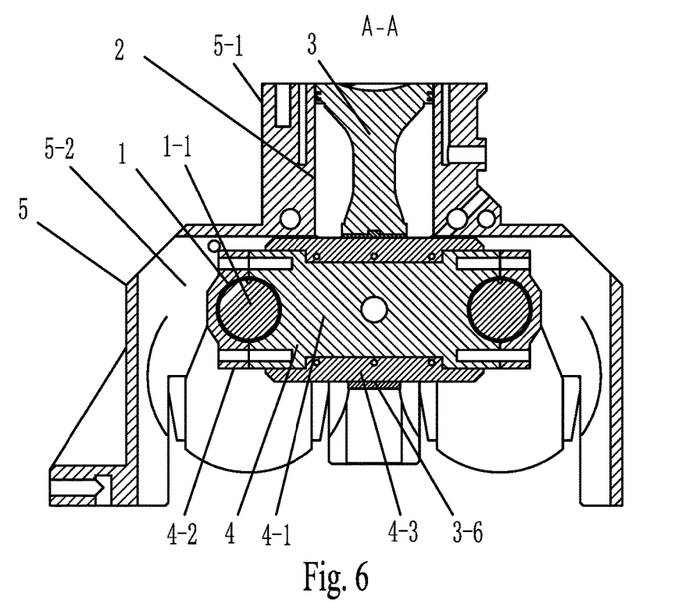
FIG. 6 is a sectional view taken along line A-A in FIG. 1.
Figure 7:
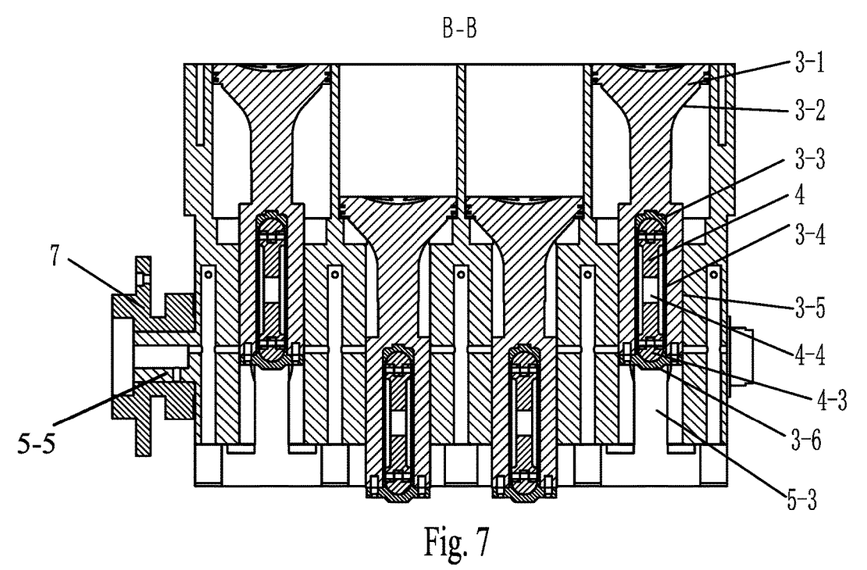
FIG. 7 is a sectional view taken along line B-B in FIG. 1.
Figure 8:
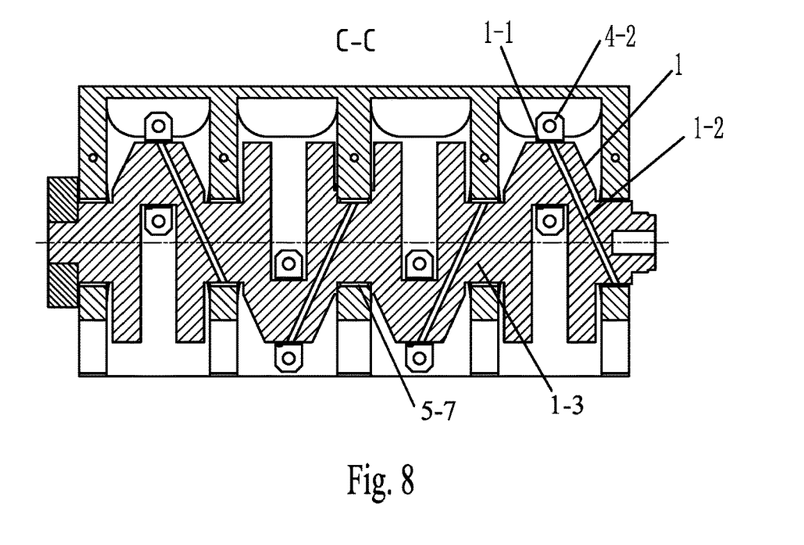
FIG. 8 is a sectional view taken along line C-C in FIG. 1.
Figure 11:
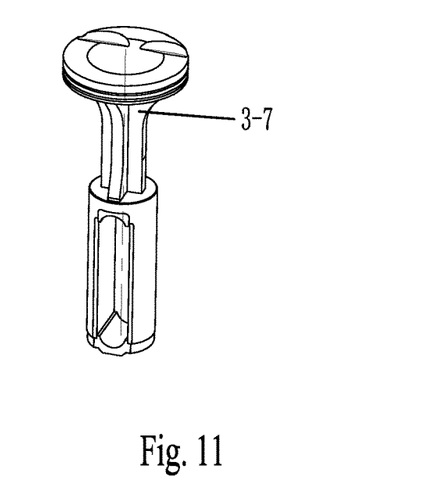
FIG. 11 is a perspective view of a piston of the present invention.

As shown in FIG. 6, FIG. 7 and FIG. 11, the neck portion 3-2 is a cross-shaped pillar composed of four rib plates 3-7, and outer sides of the four rib plates 3-7 are approximate equi-stress arcs; or an outer contour of the neck portion is a revolution body shape having an approximate equi-stress curved surface. The person skilled in the art knows that the equi-stress design is an ideal state, which can only be approximated in engineering applications. Thus, the term "approximate" is clear. For the present invention, the piston is subjected to a certain bending moment, and the upper portion of the neck portion 3-2 is subjected to a large bending moment, so that the arc shape of the outer side of the four rib plates 3-7 is a curved line shrinking gradually from the top to the bottom. The shape of the pillar is a rotary body with a decreasing diameter from the top to the bottom.

Figure 13:
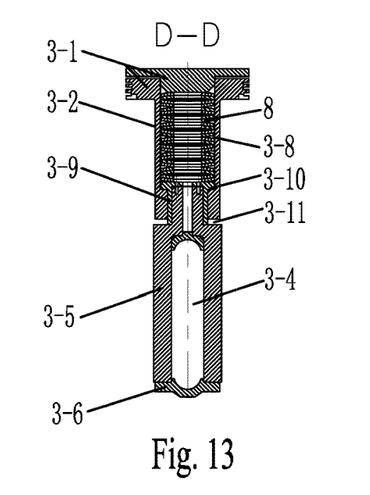
FIG. 13 is a sectional view taken along line D-D in FIG. 14.
Figure 14:
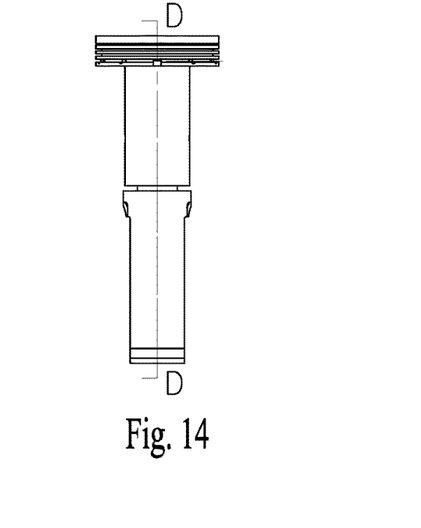
FIG. 14 is a structural schematic view showing a piston having a variable compression ratio of the present invention.

As shown in FIG. 13 and FIG. 14, the piston 3 is a piston having a variable compression ratio. Guiding slider 3-9 is connected between the neck portion 3-2 and the piston guiding rod 3-5. The guiding slider 3-9 is slidably connected to the neck portion 3-2 and is provided with a limiting device 3-10. The guiding slider 3-9 and the piston guiding rod 3-5 are detachably and fixedly connected. Elastic member groove 3-8 is provided inside the neck portion 3-2. Elastic member 8 is provided inside the elastic member groove 3-8. Compression clearance 3-11 is set aside between the neck portion 3-2 and the piston guiding rod 3-5. By means of the piston mechanism having variable compression ratio of the present invention, the compression ratio can realize the change from 11 to 18.6. Under the premise of ensuring a high load without knocking, the thermal efficiency of the medium-small load is improved, thereby saving fuel consumption by 20%.

The elastic member 8 includes a plurality of disc springs, which can sustain a large load, is easy to install, and has high security.

In the double-crank mechanism, the friction force between the piston and the connection rod causes the lateral force of the piston, and the piston reciprocates along with the guiding block. The lateral force of the piston is completely sustained by the piston guiding groove so as not to cause impact and friction between the piston and the cylinder liner. The friction between the piston and the connection rod and the friction between the piston and the piston guiding groove are in a low-temperature and easy-to-lubricate environment. In the embodiment, the friction coefficient of the surface between the piston and the connection rod is 0.02-0.06, and the effect is that: when the rotating speed of the engine is 4000 r/min, the conventional crank slider mechanism has a maximum lateral force of 3500 N and a piston speed of 16 m/s, thereby causing the problems such as the abrasion, sealing, air leakage, and mechanical noise between the piston and the cylinder liner. However, the piston of the present invention has a special design: the guiding end and the sealing end are separated. The guiding end is subjected to the full load and is in a low-temperature and easy-to-lubricate area, and the sealing end is unloaded and in a high-temperature region, so the above-mentioned problems can be well solved. The maximum output torque of a reciprocating in-line engine with four cylinders and an engine displacement of 1.8 L is: 225 Nm (corresponding to the speed of 4000 r/min), and the maximum output power thereof: 118 KW (corresponding to the speed of 5500 r/min). One of the main factors limiting the increase of 4000 r/min at the maximum torque moment is the abrasion of the piston and cylinder. After the maximum torque moment, the engine will automatically decrease the quantity of fuel injection to reduce the abrasion. The piston guiding mechanism of the dual-crankshaft engine of the present invention is in a low-temperature and easy-to-lubricate environment, in which the pressure lubrication mode of the motion pair is rather mature, and the abrasion loss is small. Thus, the rotation speed corresponding the maximum torque can be extended to about 5500 r/min.

Moreover, the present invention can decrease height dimension of the engine. In the traditional horizontally opposed engine, the lateral dimension is a key size that restricts the overall arrangement of the automobile. In order to reduce the lateral force of the piston and the cylinder liner, the hole central distance of the connection rod of the crank slider mechanism is 3.2 to 4 times than the gyration radius of the crankshaft. The double-crank mechanism provided by the present invention is not limited by this factor.

What is claimed is:

1. A dual-crankshaft engine, comprising: a cylinder, a cylindrical block and a piston capable of linearly reciprocating in the cylinder, wherein two crankshafts provided in parallel are arranged on two sides of the cylinder, and a connection rod is hinged between crank pins corresponding to the two crankshafts to form a double-crank mechanism;

the cylindrical block comprises a block portion forming the cylinder and a crankshaft support portion for containing and supporting the double-crank mechanism;

a piston head is provided on a top end of the piston; a neck portion is provided on a lower end of the piston head; a piston guiding rod is provided on a lower end of the neck portion; a slot is provided on the piston guiding rod; the connection rod is slidably inserted into the slot; a piston rod guiding groove matched with the piston guiding rod is provided in the cylindrical block; a lower end of the slot is open and is provided with a piston end cover; the piston end cover and the piston guiding rod are detachably and fixedly connected;

the piston is a non-skirted piston with a piston guiding end separated from a piston sealing end; the piston sealing end comprises the piston head; the piston guiding end comprises the piston guiding rod and the piston rod guiding groove;

a plurality of cylinders are provided; the plurality of cylinders are arranged in a row or two rows opposing each other; amounts and positions of a plurality of pistons, a plurality of connection rods, a plurality of guiding rods, and a plurality of crank pins on each crankshaft correspond to amounts and positions of the cylinders;

the connection rod comprises a connection rod main body located in the slot connection rod semicircular covers are mounted at two ends of the connection rod main body; the connection rod semicircular covers and the connection rod main body are detachably and fixedly connected to a hinge portion of the crank pins; an upper edge and a lower edge of the connection rod main body contacting the slot are provided with a wear-resistant layer respectively.

2. The dual-crankshaft engine according to claim 1, wherein portions in which the pistons and the cylinders directly contact high temperature gas are made of a ceramic material.

3. The dual-crankshaft engine according to claim 1, wherein the wear-resistant layer is coated on a surface of the connection rod main body, or a separately formed semicircular wear-resistant material layer, or a separately arcuate block-shaped wear-resistant material layer.

4. The dual-crankshaft engine according to claim 1, wherein the piston guiding rod is cylindrical.

5. The dual-crankshaft engine according to claim 1, wherein a transmission gear is mounted on an end portion of each crankshaft; an output gear is engaged and mounted between the transmission gear of each of the crankshafts, and is mounted on a mandrel of the cylindrical block; a housing for containing the transmission gear is provided on the cylindrical block.

6. The dual-crankshaft engine according to claim 1, wherein a spindle of each crankshaft passes through shaft holes inside the cylindrical block; a semicircular cover is mounted on a bottom of each shaft hole.

7. The dual-crankshaft engine according to claim 1, wherein the neck portion is a cross-shaped pillar composed of four rib plates, and outer sides of the four rib plates are approximate equi-stress arcs; or an outer contour of the neck portion is a rotary body shape having an approximate equi-stress curved surface.

8. The dual-crankshaft engine according to claim 1, wherein the piston is a piston having a variable compression ratio; a guiding slider is connected between the neck portion and the piston guiding rod; the guiding slider is slidably connected to the neck portion and is provided with a limiting device; the guiding slider and the piston guiding rod are detachably and fixedly connected; an elastic member groove is provided inside the neck portion; an elastic member is provided inside the elastic member groove; a compression clearance is set aside between the neck portion and the piston guiding rod.

9. The dual-crankshaft engine according to claim 8, wherein the elastic member comprises a plurality of disc springs.

* * * * *